United States Patent
Zhu et al.

(10) Patent No.: US 10,405,367 B2
(45) Date of Patent: Sep. 3, 2019

(54) METHODS USED IN USER EQUIPMENT AND ASSOCIATED UES

(71) Applicant: Telefonaktiebolaget LM Ericsson (publ), Stockholm (SE)

(72) Inventors: Huaisong Zhu, Beijing (CN); Qianxi Lu, Beijing (CN); Zhan Zhang, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 120 days.

(21) Appl. No.: 15/515,756

(22) PCT Filed: Feb. 23, 2016

(86) PCT No.: PCT/CN2016/074314
§ 371 (c)(1),
(2) Date: Mar. 30, 2017

(87) PCT Pub. No.: WO2017/143504
PCT Pub. Date: Aug. 31, 2017

(65) Prior Publication Data
US 2018/0332648 A1 Nov. 15, 2018

(51) Int. Cl.
*H04L 29/06* (2006.01)
*H04W 28/06* (2009.01)
(Continued)

(52) U.S. Cl.
CPC ........... *H04W 76/15* (2018.02); *H04L 69/14* (2013.01); *H04W 28/06* (2013.01); *H04W 28/08* (2013.01); *H04W 76/20* (2018.02); *H04W 80/02* (2013.01)

(58) Field of Classification Search
CPC ...... H04L 69/14; H04W 28/06; H04W 28/08; H04W 36/0069; H04W 72/04;
(Continued)

(56) References Cited

U.S. PATENT DOCUMENTS 6,928,304 B2 * 8/2005 Wigell .................. H04W 36/18
370/338
8,358,669 B2 * 1/2013 Meylan ............... H04L 63/0457
370/389
(Continued)

FOREIGN PATENT DOCUMENTS

CN 103905378 7/2014
CN 104486051 4/2015
(Continued)

OTHER PUBLICATIONS

PCT Notification of Transmittal of the International Search Report and the Written Opinion of the International Searching Authority, or the Declaration for International application No. PCT/CN2016/074314—dated Nov. 11, 2016.
(Continued)

*Primary Examiner* — Eric Nowlin
(74) *Attorney, Agent, or Firm* — Sage Patent Group (57) ABSTRACT

The present disclosure relates to a method used in a User Equipment (UE) for transmitting data to a network side via at least a first and a second connection, and the associated UE. The method comprises: comparing a first number, M, of Packet Data Convergence Protocol (PDCP) Packet Data Units (PDUs) that have been successfully transmitted via the first connection with a second number, N, of PDCP PDUs that have been successfully transmitted via the second connection; and if M is larger than N by a predetermined threshold number, S, of PDCP PDUs, refraining from transmitting S PDCP PDUs to be transmitted following the N PDCP PDUs in the data via the second connection.

17 Claims, 5 Drawing Sheets

(51) Int. Cl.
*H04W 28/08* (2009.01)
*H04W 76/15* (2018.01)
*H04W 76/20* (2018.01)
*H04W 80/02* (2009.01)

(58) Field of Classification Search
CPC ..... H04W 76/15; H04W 76/20; H04W 76/25; H04W 80/02
See application file for complete search history.

(56) References Cited

U.S. PATENT DOCUMENTS

| | | | | |
|---|---|---|---|---|
| 8,396,472 | B2* | 3/2013 | Worrall | H04L 69/18 370/338 |
| 8,750,333 | B2* | 6/2014 | Susitaival | H04W 28/06 370/476 |
| 8,817,806 | B2* | 8/2014 | Kim | H04L 43/00 370/413 |
| 9,019,851 | B2* | 4/2015 | Sandlund | H04W 72/1221 370/252 |
| 9,503,964 | B2* | 11/2016 | Zhao | H04L 12/6418 |
| 9,516,524 | B2* | 12/2016 | Johansson | H04W 24/08 |
| 9,549,338 | B2* | 1/2017 | Kim | H04W 28/0278 |
| 9,749,821 | B1* | 8/2017 | Gupta | H04W 4/14 |
| 9,838,282 | B2* | 12/2017 | Dudda | H04L 43/062 |
| 9,867,096 | B2* | 1/2018 | Susitaival | H04W 36/023 |
| 10,050,894 | B2* | 8/2018 | Karaki | H04L 47/283 |
| 2008/0273537 | A1* | 11/2008 | Meylan | H04L 63/0457 370/394 |
| 2009/0103478 | A1* | 4/2009 | Sammour | H04L 1/1874 370/328 |
| 2011/0188377 | A1* | 8/2011 | Kim | H04L 49/9021 370/235 |
| 2012/0020278 | A1* | 1/2012 | Moberg | H04B 7/155 370/315 |
| 2012/0155416 | A1* | 6/2012 | Zhang | H04W 72/04 370/329 |
| 2012/0327799 | A1* | 12/2012 | Sandlund | H04W 72/1221 370/252 |
| 2013/0100840 | A1* | 4/2013 | Johansson | H04W 24/08 370/252 |
| 2014/0112157 | A1* | 4/2014 | Han | H04L 69/22 370/242 |
| 2014/0293970 | A1 | 10/2014 | Damnjanovic et al. | |
| 2014/0341023 | A1* | 11/2014 | Kim | H04W 28/0278 370/230.1 |
| 2015/0180699 | A1* | 6/2015 | Zhao | H04L 41/0668 370/228 |
| 2015/0326456 | A1* | 11/2015 | Dudda | H04L 43/062 370/252 |
| 2015/0382279 | A1* | 12/2015 | Zhao | H04L 12/6418 370/225 |
| 2016/0212753 | A1* | 7/2016 | Wu | H04W 72/085 |
| 2016/0255675 | A1* | 9/2016 | Van Lieshout | H04L 1/1829 370/329 |
| 2016/0277154 | A1* | 9/2016 | Quan | H04L 47/34 |
| 2016/0278138 | A1* | 9/2016 | Chen | H04W 36/0027 |
| 2016/0337254 | A1* | 11/2016 | Karaki | H04L 47/283 |
| 2016/0352469 | A1* | 12/2016 | Xiao | H04L 1/1867 |
| 2016/0352643 | A1* | 12/2016 | Xiao | H04L 47/32 |
| 2017/0013498 | A1* | 1/2017 | Yi | H04W 28/08 |
| 2017/0055283 | A1* | 2/2017 | Shrivastava | H04W 76/15 |
| 2017/0171905 | A1* | 6/2017 | Uchino | H04W 16/32 |
| 2017/0196018 | A1* | 7/2017 | Zeng | H04W 72/0413 |
| 2017/0374579 | A1* | 12/2017 | Wang | H04W 28/08 |
| 2018/0041413 | A1* | 2/2018 | Yi | H04W 80/02 |
| 2018/0063014 | A1* | 3/2018 | Yu | H04L 47/6205 |
| 2018/0084475 | A1* | 3/2018 | Norrman | H04W 12/02 |
| 2018/0103402 | A1* | 4/2018 | Susitaival | H04W 36/023 |
| 2018/0123920 | A1* | 5/2018 | Dudda | H04L 43/062 |
| 2018/0184312 | A1* | 6/2018 | Yi | H04L 43/06 |
| 2018/0241509 | A1* | 8/2018 | Phuyal | H04L 1/1614 |
| 2018/0270139 | A1* | 9/2018 | Singh | H04L 43/16 |
| 2018/0270718 | A1* | 9/2018 | Wang | H04J 11/0053 |
| 2018/0279173 | A1* | 9/2018 | Loehr | H04W 28/065 |
| 2019/0007291 | A1* | 1/2019 | Yi | H04L 69/22 |

FOREIGN PATENT DOCUMENTS

| | | | | |
|---|---|---|---|---|
| CN | 105659679 | A * | 6/2016 | ........ H04W 72/1284 |
| CN | 106470439 | A * | 3/2017 | ........... H04W 76/15 |
| EP | 3188561 | A1 * | 7/2017 | ........ H04W 72/0413 |
| GB | 2520923 | B * | 7/2017 | ............ H04L 41/00 |
| KR | 20130093987 | A | 8/2013 | |
| KR | 101434631 | B1 * | 8/2014 | |
| WO | WO 2014 179982 | | 11/2014 | |
| WO | WO-2014185727 | A1 * | 11/2014 | ....... H04W 28/0278 |
| WO | 2015011184 | A1 | 1/2015 | |
| WO | 2015012545 | A1 | 1/2015 | |
| WO | WO-2015065080 | A1 * | 5/2015 | ........... H04L 1/1829 |
| WO | 2015119411 | A1 | 8/2015 | |
| WO | WO-2015115205 | A1 * | 8/2015 | ....... H04W 72/1284 |
| WO | WO-2015145255 | A2 * | 10/2015 | ............ H04W 76/11 |
| WO | WO-2015145255 | A3 * | 11/2015 | ............ H04W 76/11 |
| WO | WO-2016021662 | A1 * | 2/2016 | ............ H04W 16/32 |
| WO | WO-2016078699 | A1 * | 5/2016 | ............ H04W 88/06 |
| WO | WO-2017164901 | A1 * | 9/2017 | ......... H04W 28/085 |

OTHER PUBLICATIONS

Extended European Search Report for European Patent Application No. EP16890958.8, dated Jul. 9, 2019, 7 pages.

* cited by examiner

METHODS USED IN USER EQUIPMENT AND ASSOCIATED UES

PRIORITY

This nonprovisional application is a U.S. National Stage Filing under 35 U.S.C. § 371 of International Patent Application Serial No. PCT/CN2016/074314 filed Feb. 23, 2016, and entitled "METHODS USED IN USER EQUIPMENT AND ASSOCIATED UES."

TECHNICAL FIELD

The present disclosure generally relates to the technical field of wireless communications, and particularly, to a method used in a User Equipment (UE) transmitting data to a network side via at least a first and a second connection and the associated UEs.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Currently, wireless communication networks or systems operating at high frequencies from 10-300 GHz are emerging as a promising technology to meet exploding bandwidth requirements by enabling multi-Gb/s speeds. For example, the 5th Generation (5G) network is likely to be a combination of the evolved 3rd Generation (3G) technologies, the 4th Generation (4G) technologies and emerging or substantially new components such as Ultra-Density Network (UDN).

To meet requirements on dramatically increased traffic, one interesting option for development of the 5G network is to move to new frequency bands which have large amounts of spectrum. Particular bands of interest are the MilliMeter-Wave (MMW) bands of 15-90 GHz. Propagation poses a unique challenge for MMW systems. Besides large scale propagation loss, in reality, at least three factors such as Terminal rotation, obstacles and mobility lead to quick link quality fluctuation at high-frequency radio.

In other sides, some higher requirements are put on the 5G systems. For instance, Critical-Machine Type Communication (C-MTC) may require a high reliability and low delay. That is to say, instead of throughput maximization, robustness enhancement by diversity from multiple points (also referred to as Multiple Point Diversity (MPD) hereinafter) is necessary for the 5G systems, especially when working at MilliMeter-Wave.

Figure 1:
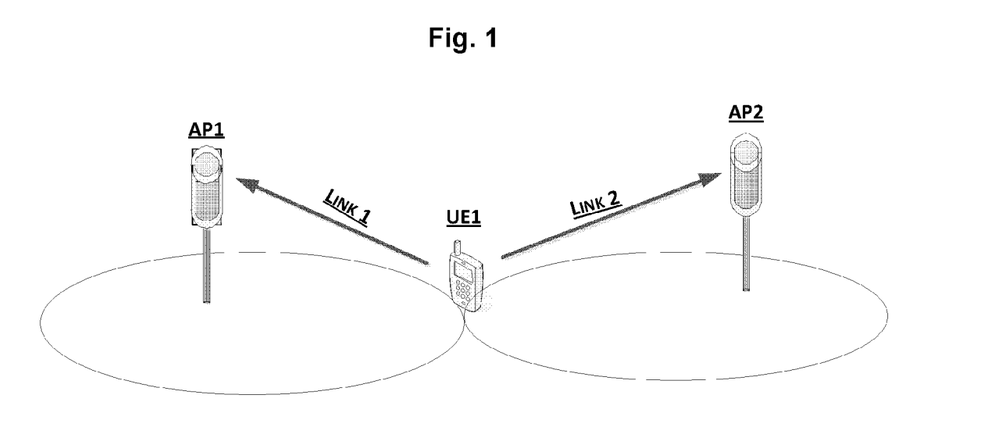
FIG. 1 illustrates an exemplary scenario where MPD may be applied.

FIG. 1 illustrates an exemplary scenario where MPD may be applied.

As shown in FIG. 1, UE1 will establish (at least) two connections with two different access points, AP1 and AP2, and transmit the same data to the network side via the two connections simultaneously. Then, the network side is responsible for collecting the UE1's data from the two access points to get the MPD gain.

Figure 2:
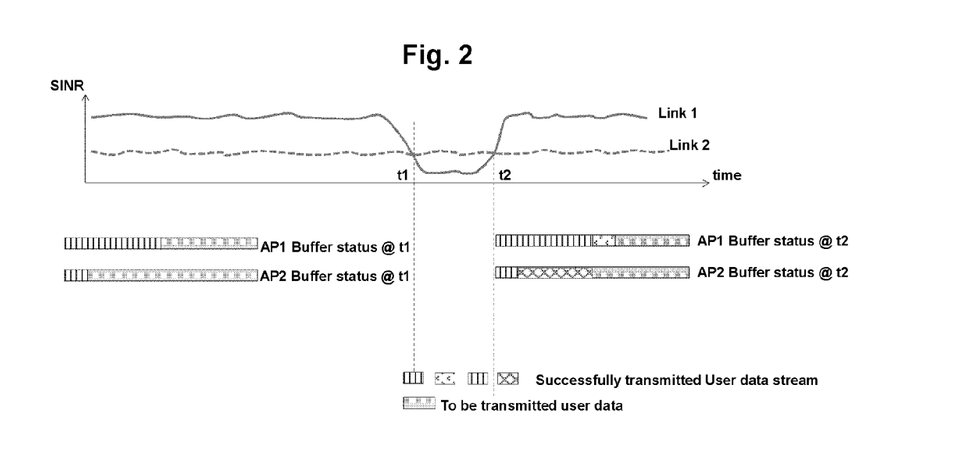
FIG. 2 illustrates an exemplary simulation to show a problem of the normal uplink MPD.

FIG. 2 illustrates an exemplary simulation to show a problem of the normal uplink MPD. For sake of explanation, the simulation is made in the scenario as illustrated in FIG. 1, where UE1 transmits data to the network side simultaneously via AP1 and AP2. Connections via AP1 and AP2 are denoted as Link 1 and Link 2, respectively.

As illustrated, before time of t1, Link 1 is much better than Link 2 and most of the data is actually transmitted via AP1. From t1 to t2, Link 2 is better than Link 1. So, from time of 0 to t1, the amount of data that has been successfully transmitted via AP1 is much bigger than that of AP2. From t1 to t2, AP2 receives more data than AP1. Then, from t2, the situation returns to the period from 0 to t1. Therefore, from UE1's point of view, it does not get any gain from this diversity during the period from t1 to t2, because some pending portions of the data are still to be transmitted via AP2. Hereinafter, transmissions of such pending portions of the data may be referred to as pending transmissions.

SUMMARY

It is in view of at least one of the above considerations and others that the various embodiments of the present technology have been made. The present disclosure proposes to alleviate pending translations at the UE side, so as to get the higher uplink transmission efficiency from MPD.

According to a first aspect of the present disclosure, there is provided a method used in a UE for transmitting data to a network side via at least a first and a second connection. The method comprises: comparing a first number, M, of Packet Data Convergence Protocol (PDCP) Packet Data Units (PDUs) that have been successfully transmitted via the first connection with a second number, N, of PDCP PDUs that have been successfully transmitted via the second connection; and if M is larger than N by a predetermined threshold number, S, of PDCP PDUs, refraining from transmitting S PDCP PDUs to be transmitted following the N PDCP PDUs in the data via the second connection.

In an embodiment, the method further comprises: continuing transmission of the M+1$^{th}$ PDCP PDUs in the data via the second connection, following transmission of the N PDCP PDUs.

In an embodiment, the method further comprises: if transmission of the N+1$^{th}$ PDCP PDU has started, refraining from retransmission of transmitted Radio Link Control (RLC) PDUs corresponding to the N+1$^{th}$ PDCP PDU, and refraining from transmission of non-transmitted RLC PDUs corresponding to the N+1$^{th}$ PDCP PDU.

In an embodiment, the method further comprises: signaling to the network side that RLC PDUs corresponding to the N+1$^{th}$ PDCP PDU should be discarded.

In an embodiment, the method further comprises: completing transmission of the N+1$^{th}$ PDCP PDU, if transmission of the N+1$^{th}$ PDCP PDU has started.

In an embodiment, the number of PDCP PDUs that have been successfully transmitted via the connection is determined based on a Radio Link Control (RLC) feedback from the network side.

In an embodiment, the predetermined threshold number varies depending on data rates of the first and second connections.

According to a second aspect of the present disclosure, there is provided a UE for transmitting a data to a network side via at least a first and a second connection. The UE comprises: a comparing unit configured to compare a first number, M, of PDCP PDUs that have been successfully transmitted via the first connection with a second number, N, of PDCP PDUs that have been successfully transmitted via the second connection; and a transmission unit configured to, if M is larger than N by a predetermined threshold number, S, of PDCP PDUs, refrain from transmitting S PDCP PDUs to be transmitted following the N PDCP PDUs in the data via the second connection.

According to a third aspect of the present disclosure, there is provided a UE. The UE comprises: a processor; and a memory storing instructions that when executed on the processor, cause the UE to: comparing a first number, M, of PDCP PDUs that have been successfully transmitted via the first connection with a second number, N, of PDCP PDUs that have been successfully transmitted via the second connection; and if M is larger than N by a predetermined threshold number, S, of PDCP PDUs, refraining from transmitting S PDCP PDUs to be transmitted following the N PDCP PDUs in the data via the second connection.

According to a fourth aspect of the present disclosure, there is provided a computer program comprising instructions which when executed on a UE for transmitting a data to a network side via at least a first and a second connection, cause the UE to perform the method of the first aspect.

According to a fifth aspect of the present disclosure, there is provided a computer program product comprising a computer program and a computer readable storage medium on which the computer program is stored. The computer program comprises instructions which when executed on a UE for transmitting a data to a network side via at least a first and a second connection, cause the UE to perform the method of the first aspect.

The above embodiments of the first aspect are also applicable for the remaining aspects.

By means of the embodiments described herein, the present disclosure can exploit UE assistance to avoid unnecessary transmissions in MPD, thereby saving system resources and achieving more obvious diversity gain.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

The present disclosure proposes to exploit redundancy avoidance at UE side in the context of MPD. More specifically, if UE detects that certain uplink data has been successfully received by an access point, yet still pending for another access point, UE makes a decision and informs the network side to avoid unnecessary transmission of the uplink data to the another access point. The unnecessary transmission here involves RLC (re-)transmission and/or PDCP transmission of the uplink data to the another access point.

Figure 3:
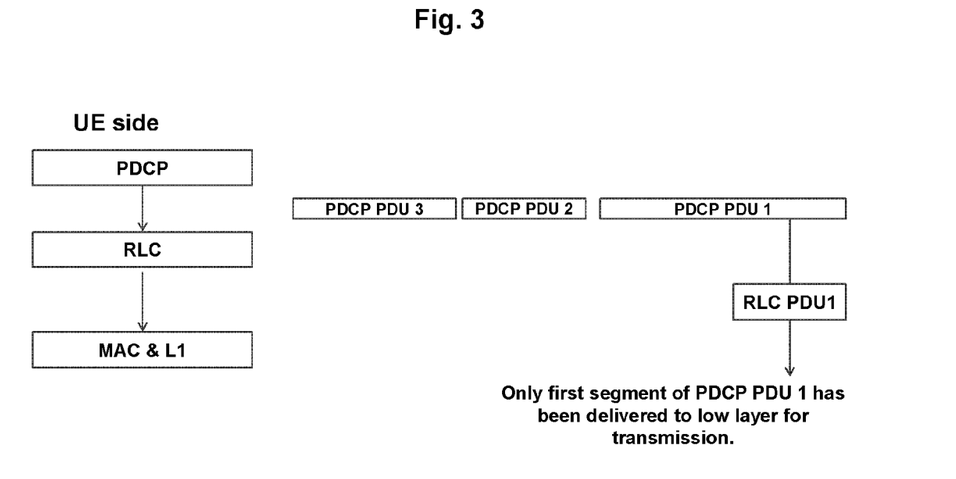
FIG. 3 illustrates transmission status of PDCP/RLC PDUs before redundancy avoidance according to the present disclosure.

FIG. 3 illustrates transmission status of PDCP/RLC PDUs before redundancy avoidance according to the present disclosure.

As well-known in the communication field, before transmitting certain data to the network side, UE should firstly process the data in a hierarchy manner. Normally, data may be encapsulated into PDCP PDUs at the PDCP layer, and then each PDCP PCU will be encapsulated as multiple RLC PDUs at the RLC layer, which in turn will be delivered to the low layer, e.g., the MAC layer and Layer 1 (L1), for transmission to the network side. In the example of FIG. 3, data to be transmitted is encapsulated into three PDCP PDUs, which are numbered as PDCP PDU 1, PDCP PDU 2, and PDCP PDU 3, respectively. PDCP PDU 1 is encapsulated as multiple RLC PDU. FIG. 3 illustrates the transmission status when only the first segment of PDCP PDU 1 (i.e., RLC PDU 1) has been delivered to the low layer for transmission to the network side.

Figure 4:
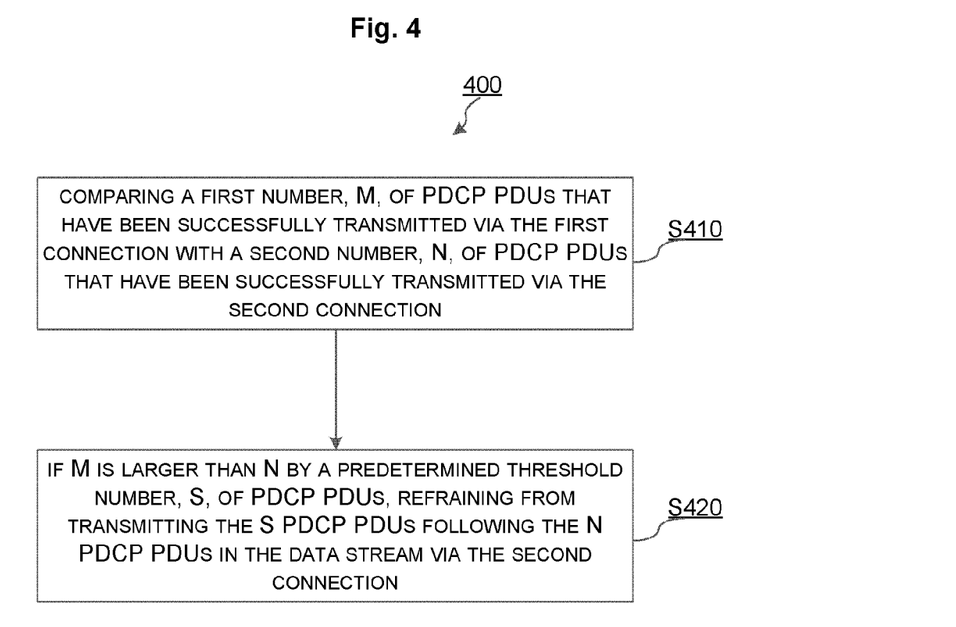
FIG. 4 schematically illustrates a method 400 used in a UE according to embodiments of the present disclosure.

FIG. 4 schematically illustrates a method 400 used in a UE according to embodiments of the present disclosure. The method 400 may be applied in a scenario where the UE is to transmit data to a network side via at least a first and a second connection. For sake of illustration, the method 400 will be described in the scenario as shown in FIG. 1, where the method 400 is used at UE1 for transmitting data to the network side via Link 1 and Link 2 (i.e., via AP1 and AP2). It should be noted that the method 400 will be also applied in other scenarios, where more than two connections are involved in MPD.

At step S410, UE1 compares a first number of PDCP PDUs that have been successfully transmitted via Link 1 with a second number of PDCP PDUs that have been successfully transmitted via Link 2. Here, the first number and the second number are denoted as M and N, respectively. As UE1 transmits the same data to AP1 and AP2 via Link 1 and Link 2, respectively, UE1 could be aware of respective transmission progresses over Link 1 and Link 2. That is, M and N should be known to UE1.

In an implementation, UE1 may determine the number of PDCP PDUs that have been successfully transmitted via the connection based on a RLC feedback from the network side. For example, UE1 may determine M based on a RLC feedback for data transmission over Link 1. Similarly, N may be determined based on a RLC feedback for data transmission over Link 2.

Although the method 400 is described in the context of involving two connections, it would be appreciated that the present disclosure is also applicable in the scenario where UE1 have more than two connections with the network side. In this case, a similar mechanism with step S410 may be applied. Take a scenario where UE1 have three connections with the network side as an example. In this example, UE1 needs to determine a connection that has the maximum number of PDCP PDUs that have been successfully transmitted via the connection, among the three connections. Obviously, there is no unnecessary transmission over the determined connection. Then, UE1 compares the remaining two connections with the connection having the maximum number, respectively, as done at step S410, so as to determine whether there is unnecessary transmission over the remaining two connections.

At step S420, if M is larger than N by a predetermined threshold number, S, of PDCP PDUs, UE1 refrains from transmitting S PDCP PDUs to be transmitted following the N PDCP PDUs in the data via Link 2. In other words, if the comparison result shows that M is larger than N by S, UE1 may decide that there is unnecessary transmission occurring over Link 2, and then avoid pending transmission of S PDCP PDUs following the N PDCP PDUs in the data via Link 2.

Optionally, the method 400 may further comprise continuing transmission of the $M+1^{th}$ PDCP PDUs in the data via the second connection, following transmission of the N PDCP PDUs.

In an implementation, S varies depending on data rates of Link 1 and Link 2. For example, if UE1 is located at the edge of AP2 and a data rate over Link 2 is low, since M is larger than N by S, it will take a quite long time for AP2 to catch up with the progress of AP1. Otherwise, if the data rate over Link 2 is quite high, AP2 will soon catch up with the progress of AP1. So, as compared with the former case, S may be increased in the latter case.

Taking the transmission status of FIG. 3 as an example, then M is 2 and N is 0. In this case, S is 2. According to the present disclosure, UE1 refrains from transmitting two PDCP PDUs to be transmitted following the zero PDCP PDU in the data via Link 2, i.e., PDCP PDU 1 and PDCP PDU 2. Then, UE1 will continue transmission of PDCP PDU 3 via Link 2.

Hereinafter, two implementations on how to perform the avoidance on data transmission over Link 2 will be described in details.

In a first implementation, the avoidance on data transmission over Link 2 may be performed at the RLC layer. In this implementation, the method 400 may comprise if transmission of the $N+1^{th}$ PDCP PDU has started, refraining from retransmission of transmitted RLC PDUs corresponding to the $N+1^{th}$ PDCP PDU, and refraining from transmission of non-transmitted RLC PDUs corresponding to the $N+1^{th}$ PDCP PDU. The method 400 may further comprise signaling to the network side that RLC PDUs corresponding to the $N+1^{th}$ PDCP PDU should be discarded.

Figure 5:
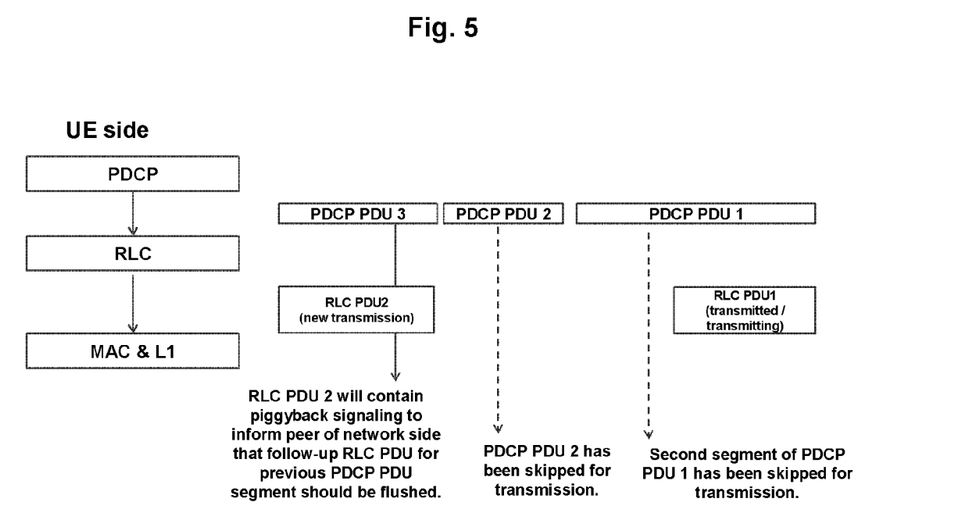
FIG. 5 is a diagram illustrating PDCP/RLC PDU processing at UE according to the present disclosure.

FIG. 5 is a diagram illustrating PDCP/RLC PDU processing at UE according to the present disclosure. Assume that 2 PDCP PDUs have been successfully transmitted via Link 1, and there is no PDCP PDU that has been successfully transmitted via Link 2. That is, M is 2 and N is 0, and thus S is 2.

As shown in FIG. 5, if UE1 has not even started transmission of PDCP PDU1, UE1 will not transmit any segment of PDCP PDU 1, and instead, directly transmit PDCP PDU 3. Then, PDCP PDU 3 will be encapsulated as RLC PDU 2. In this new RLC PDU, a piggyback signaling may be inserted to inform the network side that previous PDCP segment (i.e., RLC PDU1) should be discarded (flushed) if some segment is still not successfully received.

Another case is RLC PDU1 is still in transmission due to some air interface retransmission delay. In this case, UE1 refrains from any retransmission of transmitted RLC PDU 1. Also, all RLC PDUs whose SN is less than RLC PDU 2 should be discarded. Similarly, UE1 may signal to the network side that RLC PDUs corresponding to PDCP PDU 1 should be discarded, e.g., by means of a piggyback signaling.

With the first implementation of the method 400, the present disclosure makes UE to find out which data PDUs (i.e., PDCP PDU and/or RLC PDU) are unnecessary to transmit, thereby fully achieving MPD gain.

Corresponding to the first implementation, there should be an adaptation at the network side. In particular, after receiving, from UE1, the signaling that RLC PDUs corresponding to the $N+1^{th}$ PDCP PDU should be discarded, the network side will discard all pending RLC PDUs in buffer and clear related RLC internal status at the RLC layer.

Figure 6:
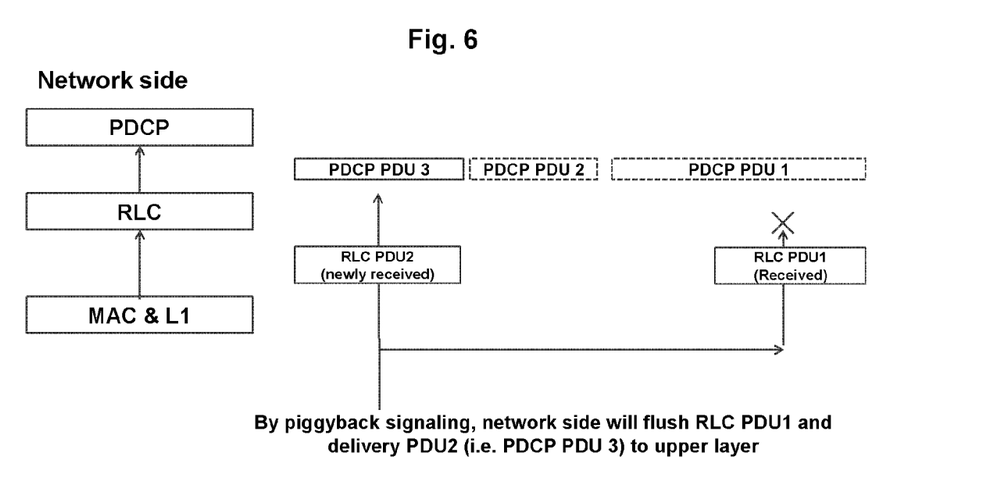
FIG. 6 is a diagram illustrating PDCP/RLC PDU processing at network side according to the present disclosure.

FIG. 6 is a diagram illustrating PDCP/RLC PDU processing at network side according to the present disclosure. The PDCP/RLC PDU processing at the network side as illustrated in FIG. 6 corresponds to that at UE side of FIG. 5.

As shown in FIG. 6, the RLC layer at the network side will discard and flush all pending RLC PDUs corresponding to PDCP PDU 1, and directly deliver RLC PDU2 corresponding to PDCP PDU 3 to the PDCP layer.

In a second implementation of the method 400, the avoidance on data transmission over Link 2 may be performed at the PDCP layer. In this implementation, the method 400 may further comprise completing transmission of the $N+1^{th}$ PDCP PDU, if transmission of the $N+1^{th}$ PDCP PDU has started.

Figure 7:
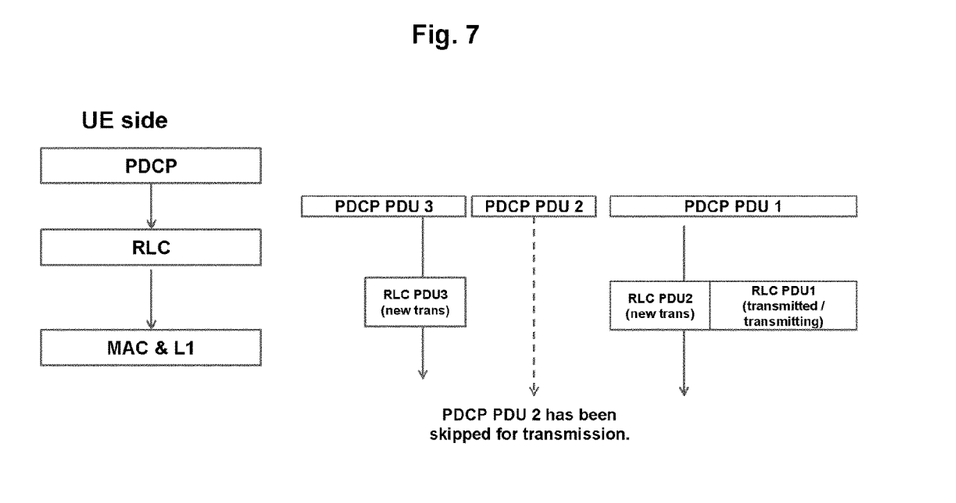
FIG. 7 is a diagram illustrating PDCP/RLC PDU processing according to the present disclosure.

FIG. 7 is a diagram illustrating PDCP/RLC PDU processing according to the present disclosure. Assume that 2 PDCP PDUs have been successfully transmitted via Link 1, and there is no PDCP PDU that has been successfully transmitted via Link 2. That is, M is 2 and N is 0, and thus S is 2.

As illustrated in FIG. 7, if UE1 wants to avoid transmission of PDCP PDU1 and PDU 2, but it finds that PDCP PDU 1 has been delivered to RLC layer for transmission, then UE1 will still continue to transmit follow-up segments of PDCP PDU 1. But for PDCP PDU 2, it will not be transmitted.

According to this implementation, the PDCP layer at the UE side will view some package been lost, but PDCP header itself contains a sequence number and thus can handle the PDCP package loss issue. In other words, the method 400 can be implemented at UE1 itself without impacting the network side.

Figure 8:
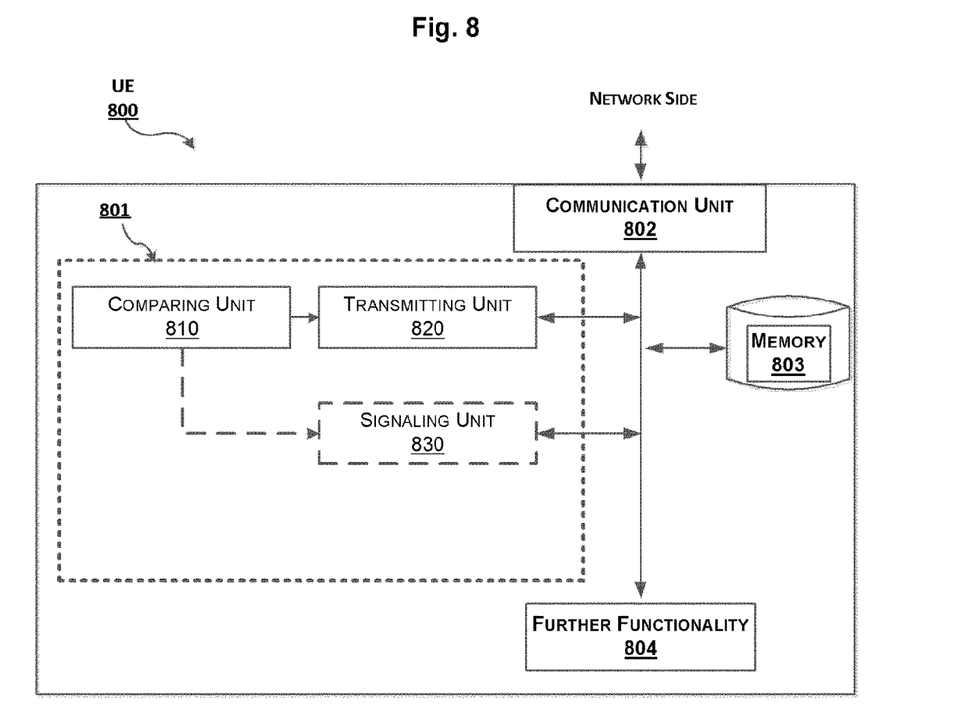
FIG. 8 is a schematic block diagram of a UE 800 according to embodiments of the present disclosure.

FIG. 8 is a schematic block diagram of a UE 800 according to embodiments of the present disclosure. The UE 800 is to transmit a data to a network side via at least a first and a second connection. For example, the UE 800 may be UE1 as shown in FIG. 1, and the first connection and the second connection may be Link 1 and Link 2 as shown in FIG. 1.

The part of the UE 800 which is most affected by the adaptation to the herein described method, e.g., the method 400, is illustrated as an arrangement 801, surrounded by a dashed line. The UE 800 and arrangement 801 are further configured to communicate with other entities such as AP1 and AP2 via a communication unit 802 which may be regarded as part of the arrangement 801. The communication unit 802 comprises means for wireless communication. The arrangement 801 or the UE 800 may further comprise other functional units 804, such as functional units providing regular routing functions, and may further comprise one or more memories 803.

The arrangement 801 could be implemented, e.g., by one or more of: a processor or a microprocessor and adequate software and memory for storing of the software, a Programmable Logic Device (PLD), or other electronic component(s) or processing circuitry configured to perform the actions described above, and illustrated, e.g., in FIG. 4. The arrangement part of the UE 800 may be implemented and/or described as follows.

Referring to FIG. 8, the UE 800 comprises a comparing unit 810, a transmitting unit 820, and a signaling unit 830. The signaling unit 830 is optional.

The comparing unit 810 may be configured to compare a first number, M, of PDCP PDUs that have been successfully transmitted via the first connection with a second number, N, of PDCP PDUs that have been successfully transmitted via the second connection. For example, the number of PDCP PDUs that have been successfully transmitted via the connection is determined based on a RLC feedback from the network side.

The transmission unit 820 may be configured to, if M is larger than N by a predetermined threshold number, S, of PDCP PDUs, refrain from transmitting S PDCP PDUs to be transmitted following the N PDCP PDUs in the data via the second connection. For example, the predetermined threshold number varies depending on data rates of the first and second connections.

In an implementation, the transmission unit 820 may be further configured to continue transmission of the $M+1^{th}$ PDCP PDUs in the data via the second connection, following transmission of the N PDCP PDUs.

In another implementation, the transmission unit 820 may be further configured to: if transmission of the $N+1^{th}$ PDCP PDU has started, refrain from retransmission of transmitted RLC PDUs corresponding to the $N+1^{th}$ PDCP PDU, and refrain from transmission of non-transmitted RLC PDUs corresponding to the $N+1^{th}$ PDCP PDU.

In this implementation, the signaling unit 830 is configured to signal to the network side that RLC PDUs corresponding to the $N+1^{th}$ PDCP PDU should be discarded.

In yet another implementation, the transmission unit 820 may be further configured to complete transmission of the $N+1^{th}$ PDCP PDU, if transmission of the $N+1^{th}$ PDCP PDU has started.

Figure 9:
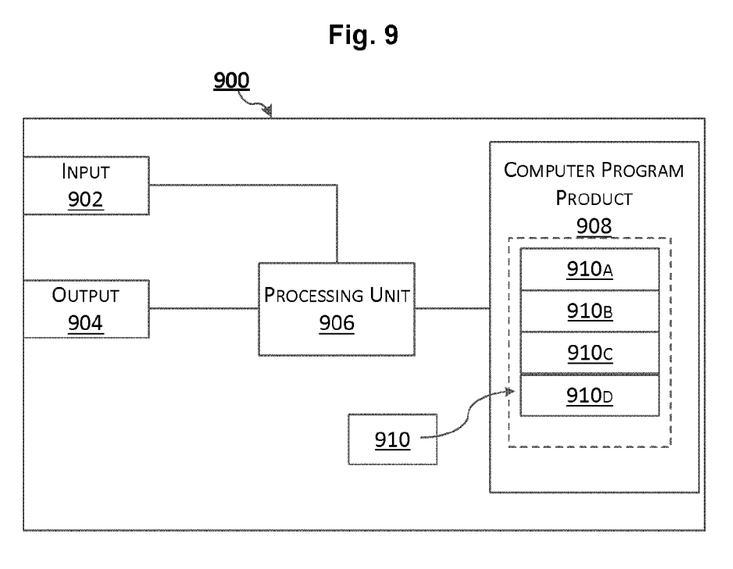
FIG. 9 schematically shows an embodiment of an arrangement 900 comprising at least one particular computer program product 908 according to embodiments of the present disclosure.

FIG. 9 schematically shows an embodiment of an arrangement 900 comprising at least one particular computer program product 908 according to embodiments of the present disclosure. The arrangement 900 may be used in the UE 800 according to the present disclosure. Comprised in the arrangement 900 are here a processing unit 906, e.g., with a Digital Signal Processor (DSP). The processing unit 906 may be a single unit or a plurality of units to perform different actions of procedures described herein. The arrangement 900 may also comprise an input unit 902 for receiving signals from other entities, and an output unit 904 for providing signal(s) to other entities. The input unit and the output unit may be arranged as an integrated entity or as illustrated in the example of FIG. 8.

Furthermore, the at least one computer program product 908 may be in the form of a non-volatile or volatile memory, e.g., an Electrically Erasable Programmable Read-Only Memory (EEPROM), a flash memory and a hard drive. The computer program product 908 comprises a computer program 910, which comprises code/computer readable instructions, which when executed by the processing unit 906 in the arrangement 900 causes the arrangement 900 and/or the UE in which it is comprised to perform the actions, e.g., of the procedure described earlier in conjunction with either of FIG. 4.

The computer program 910 may be configured as a computer program code structured in computer program modules 910A-910D. Hence, in an exemplifying embodiment when the arrangement 900 is used in the UE 800, the code in the computer program of the arrangement 900 includes a comparing module 910A, for comparing a first number, M, of PDCP PDUs that have been successfully transmitted via the first connection with a second number, N, of PDCP PDUs that have been successfully transmitted via the second connection. The code in the computer program 910 further includes a transmission module 910B, for, if M is larger than N by a predetermined threshold number, S, of PDCP PDUs, refraining from transmitting S PDCP PDUs to be transmitted following the N PDCP PDUs in the data via the second connection. The code in the computer program 910 may further include a signaling module 910C, for signaling to the network side that RLC PDUs corresponding to the $N+1^{th}$ PDCP PDU should be discarded. The code in the computer program 910 may comprise further modules, illustrated as module 910D, e.g. for controlling and performing other related procedures associated with the UE's operations.

The computer program modules could essentially perform the actions of the flow illustrated in FIG. 4, to emulate the UE 800. In other words, when the different computer program modules are executed in the processing unit 806, they may correspond, e.g., to the units 810-830 of FIG. 8.

Although the code means in the embodiments disclosed above in conjunction with FIG. 9 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

The invention claimed is:

1. A method used in a User Equipment (UE) for transmitting data to a network side via at least a first connection and at least a second connection, the method comprising:
   transmitting a first number, M of Packet Data Convergence Protocol (PDCP) Packet Data Units (PDUs) via the first connection;
   transmitting a second number, N of PDCP PDUs via the second connection;

comparing the first number, M, of PDCP PDUs that have been successfully transmitted via the first connection with the second number, N, of PDCP PDUs that have been successfully transmitted via the second connection; wherein each number of PDCP PDUs that have been successfully transmitted via each connection is determined based on a Radio Link Control (RLC) feedback from the network side; and if M is larger than N by a predetermined threshold number, S, of PDCP PDUs, refraining from transmitting S PDCP PDUs to be transmitted following the N PDCP PDUs in the data via the second connection, thereby to alleviate pending translations at the UE to get a higher uplink transmission efficiency from Multiple Point Diversity (MPD).

2. The method according to claim 1, further comprising:
continuing transmission of at least a $M+1^{th}$ PDCP PDUs in the data via the second connection, following transmission of the N PDCP PDUs.

3. The method according to claim 1, further comprising:
if transmission of at least a $N+1^{th}$ PDCP PDU has started, refraining from retransmission of transmitted Radio Link Control (RLC) PDUs corresponding to the $N+1^{th}$ PDCP PDU, and refraining from transmission of non-transmitted RLC PDUs corresponding to the $N+1^{th}$ PDCP PDU.

4. The method according to claim 3, further comprising:
signaling to the network side that RLC PDUs corresponding to the $N+1^{th}$ PDCP PDU should be discarded.

5. The method according to claim 1, further comprising:
completing transmission of at least a $N+1^{th}$ PDCP PDU, if transmission of the $N+1^{th}$ PDCP PDU has started.

6. The method according to claim 1, wherein the predetermined threshold number varies depending on data rates of the first connection and the second connection.

7. A User Equipment (UE) for transmitting a data to a network side via at least a first connection and at least a second connection, the UE comprising:
a processor; ands
a memory storing instructions that when executed on the processor, cause the UE to:
transmit a first number, M of Packet Data Convergence Protocol (PDCP) Packet Data Units (PDUs) via the first connection;
transmit a second number, N of PDCP PDUs via the second connection;
compare the first number, M, of PDCP PDUs that have been successfully transmitted via the first connection with the second number, N, of PDCP PDUs that have been successfully transmitted via the second connection; wherein each number of PDCP PDUs that have been successfully transmitted via each connection is determined based on a Radio Link Control (RLC) feedback from the network side; and
if M is larger than N by a predetermined threshold number, S, of PDCP PDUs, refraining from transmitting S PDCP PDUs to be transmitted following the N PDCP PDUs in the data via the second connection, thereby to alleviate pending translations at the UE to get a higher uplink transmission efficiency from Multiple Point Diversity (MPD).

8. The UE according to claim 7, wherein the instructions when executed on the processor further cause the UE to:
continue transmission of at least a $M+1^{th}$ PDCP PDUs in the data via the second connection, following transmission of the N PDCP PDUs.

9. The UE according to claim 7, the instructions when executed on the processor further cause the UE to:
if transmission of at least a $N+1^{th}$ PDCP PDU has started, refrain from retransmission of transmitted Radio Link Control (RLC) PDUs corresponding to the $N+1^{th}$ PDCP PDU, and refrain from transmission of non-transmitted RLC PDUs corresponding to the $N+1^{th}$ PDCP PDU.

10. The UE according to claim 9, the instructions when executed on the processor further cause the UE to:
signal to the network side that RLC PDUs corresponding to the $N+1^{th}$ PDCP PDU should be discarded.

11. The UE according to claim 7, the instructions when executed on the processor further cause the UE to:
complete transmission of at least a $N+1^{th}$ PDCP PDU, if transmission of the $N+1^{th}$ PDCP PDU has started.

12. The UE according to claim 7, wherein the predetermined threshold number varies depending on data rates of the first connection and the second connection.

13. A computer program product comprising a computer program and a non-transitory computer readable storage medium on which the computer program is stored, and wherein the computer program comprises instructions which when executed on a User Equipment (UE) for transmitting a data to a network side via at least a first connection and at least a second connection, cause the UE to perform the method of claim 1.

14. The computer program product according to claim 13, wherein the instructions when executed on the UE further cause the UE to:
continue transmission of at least a $M+1^{th}$ PDCP PDUs in the data via the second connection, following transmission of the N PDCP PDUs.

15. The computer program product according to claim 13, wherein the instructions when executed on the UE further cause the UE to:
if transmission of at least a $N+1^{th}$ PDCP PDU has started, refrain from retransmission of transmitted Radio Link Control (RLC) PDUs corresponding to the $N+1^{th}$ PDCP PDU, and refraining from transmission of non-transmitted RLC PDUs corresponding to the $N+1^{th}$ PDCP PDU; and
signal to the network side that RLC PDUs corresponding to the $N+1^{th}$ PDCP PDU should be discarded.

16. The computer program product according to claim 13, wherein the instructions when executed on the UE further cause the UE to:
complete transmission of at least a $N+1^{th}$ PDCP PDU, if transmission of the $N+1^{th}$ PDCP PDU has started.

17. The computer program product according to claim 13, wherein the predetermined threshold number varies depending on data rates of the first connection and the second connection.

* * * * *